United States Patent [19]
Eshraghi

[11] Patent Number: 5,989,300
[45] Date of Patent: Nov. 23, 1999

[54] PROCESS OF PRODUCING ELECTROCHEMICAL PRODUCTS OR ENERGY FROM A FIBEROUS ELECTROCHEMICAL CELL

[76] Inventor: Ray R. Eshraghi, 105 Scots Fir La., Cary, N.C. 27511

[21] Appl. No.: 09/274,530

[22] Filed: Mar. 23, 1999

Related U.S. Application Data

[62] Division of application No. 08/869,448, Jun. 5, 1997.

[51] Int. Cl.[6] .............................. H01M 8/02; H01M 2/18
[52] U.S. Cl. ........................... 29/623.1; 429/13; 429/27; 429/31; 429/32; 429/133
[58] Field of Search .................................. 429/27, 32, 13, 429/127, 140; 29/623.1

[56] References Cited

U.S. PATENT DOCUMENTS

| | | |
|---|---|---|
| 4,100,331 | 7/1978 | Ingham et al. ............................ 429/13 |
| 4,420,544 | 12/1983 | Lawson et al. ............................ 429/13 |
| 5,449,574 | 9/1995 | Higley .................................... 429/152 |
| 5,492,782 | 2/1996 | Higley .................................... 429/164 |

*Primary Examiner*—Maria Nuzzolillo
*Assistant Examiner*—Mark Ruthkosky

[57] ABSTRACT

The subject invention relates to a process for electrosynthesis of compounds or generation of electrical power utilizing a fibrous electrochemical cell comprised of at least an inner fibrous electrode, a membrane separator, a lumen for free passage of liquid or gas, electrolyte, and a second outer electrode. Liquid or gaseous feed is contacted with the electrodes which are isolated and sealed at the shell and bore side of the fibrous cell as in a shell and tube heat exchanger.

15 Claims, 8 Drawing Sheets

PROCESS OF PRODUCING ELECTROCHEMICAL PRODUCTS OR ENERGY FROM A FIBEROUS ELECTROCHEMICAL CELL

This application is a Divisional to U.S. Pat. application Ser. No. 08/869,448, filed Jun. 5, 1997 pending.

BACKGROUND OF THE INVENTION

In U.S. Pat. application Ser. No. 08/549,976 a fibrous cell structure for fabrication of batteries was disclosed. The fibrous geometry of the cells described provides an extremely high surface area to volume ratio when multitude of small fibers are packed into a given volume. In general, the smaller the fiber OD (outside diameter), the higher the surface area. The high surface area available to electrodes translates into a higher number of active sites participating in the electrochemical reaction, hence, giving rise to higher energy density batteries. This concept is true for all electrochemical cells. For energy producing electrochemical cells such as full cells, the high surface area to volume ratio, similar to batteries results in higher energy density. For electrochemical cells that produce a product, this results in lower energy requirement. In addition, the high surface area available to the electrocatalyst reduces the requirement of the unused bulk quantities on the electrodes, and further reduces the material and fabrication cost of the cells.

It is an object of this invention to provide a structure for fabricating electrochemical cells that have fibrous geometry and can be made with fibrous electrodes ranging in size between about 10 micron to about 10 millimeter.

It is also an object of this invention to incorporate the fibrous cells into various electrochemical cell designs for fabricating batteries, fuel cells or other electrochemical reaction cells.

SUMMARY OF THE INVENTION

The subject invention relates to fibrous electrochemical cells used for construction of electrochemical cells such as batteries (rechargeable and non rechargeable) fuel cells, and other electrochemical reaction cells. The outside diameter of the cells range between about 20 micron to about 10 millimeter depending on the cell application or requirement. The fiber cells are fabricated as a continuous fiber, but can be cut to the desired lengths for packaging into an electrochemical module.

In the cells of this invention, a fibrous electrode, composed of one or more fibers ranging in size between about 10 micron to about 10 millimeter is encapsulated by a membrane separator, preferably a polymeric material. The fibrous electrode and membrane separator assembly forms the building block of a fibrous cell. In the case of batteries the separator can closely cover the circumference of the electrode without a passage route in the lumen of the fiber.

For other electrochemical cells, a passage inside the lumen of the separator fiber is allowed for transport of the reactants to and from the electrode, inside the membrane separator. The membrane separator has a permeable or porous structure which can immobilize and hold the electrolyte in the membrane matrix, or in the cavities of the porous wall of the membrane. The electrocatalyst (or the active material in the case of batteries) with or without an electrically conductive material is impregnated, coated or extruded on the outer pores of the membrane separator. In this case one fiber contains the first electrode, the separator, the electrolyte, and the electrocatalyst (or the active material) of the second electrode or the entire second electrode. The electrocatalyst of the second electrode alternatively can be coated onto another fibrous substrate and placed adjacent to the membrane insulated electrode. With this configuration two fibers will complete a single cell.

The subject invention also relates to assembling the fiber cells into a modular form that can be used as rechargeable and non-rechargeable batteries, fuel cells, and other electrochemical reaction cells for manufacturing various products.

DETAILED DESCRIPTION OF THE INVENTION

This invention relates to fabricating fibrous electrochemical cells and to incorporating the fibrous cells into modules for various electrochemical applications. In this invention a fibrous electrode is encapsulated by a layer of a membrane separator which may be impregnated or coated with the electrocatalyst of the second electrode with or without an electrically conductive material. In this process cells of various sizes are fabricated as a continuous fiber. With cells having an OD of about 1 millimeter or less, an extremely high surface area of active electrocatalyst can be packed into a given volume. The membrane separator of the cell of this invention has a semipermeable matrix, or porous wall with small cavities ranging between about 5 Angstrom to a few microns, the pore size and structure of which can be tailored to desired specifications. The pore size and structure of the membrane is such that it immobilizes and retains the electrolyte, allows free transport of ions and dissolved gases from one electrode to the other and isolates the two electrodes, preventing short circuiting. The rigid membrane structure also, provides an structural support for impregnation and coating of the electrocatalyst of the second electrode or other polymers such as ion exchange resins or permselective polymers.

Fiber glass sheath material has been used in fabricating certain tubular battery cells as a separator material. The battery cells made with fiber glass sheath material have several limitations. In general, the cells are limited in size to the tubular structures with larger outside diameter and shorter length. Furthermore, the fiberglass sheath does not exhibit the same structural characteristic nor the flexibility in tailoring the pore size and structure of the separator, as does the separator of the cells of this invention, for forming a barrier between the liquid or gas feed introduced to the electrodes.

For electrochemical cells other than batteries, the capillary pores of the membrane when filled with the electrolyte, also act as a barrier for the feed introduced or product produced on either side of the electrodes.

In the design of the cells of this invention, the insulator or separator without an electrode inside of it, has an structure similar to a hollow fiber membrane. FIG. 1A, and 1B shows the side view and cross section of a hollow fiber membrane. Hollow fibers membranes are extremely small tubes with an inside or outside diameter of about 30 micron to a few millimeter. The walls of the hollow fiber membranes are porous with pores ranging from a few angstroms to a few microns depending on the type of membranes. Based on the size of wall pores, hollow fiber membranes are classified as micro filtration, ultra filtration, reverse osmosis, etc. The porous, open structure walls of microporous hollow fiber membranes allow free transfer of liquids or gases from the outside or shell side of the fiber to the inside or the bore side of the fiber. In semipermeable membranes the membrane structure is denser without well defined pores of the microporous membranes. The membranes are permeable to certain molecules through sorption and diffusion of the molecule through the membrane matrix. Hollow fiber membranes can be fabricated from variety of polymeric material such as polypropylene, polysulfone, regenerated cellulose acetate, polyamide, polyacrylonitrile, polyethyl methacralyte to name a few and from other materials such as glass and ceramics. Polymeric hollow fibers are typically fabricated by variety of wet, dry or melt spinning techniques. The fabrication of various types of hollow fiber membranes has been covered extensively in open literature and is well documented. Examples of more detailed description of hollow fiber membrane fabrication can be found in the journal of *Separation Since and Technology,* 27(2), pp. 161–172, 1992, and under the reference ; I. Cabasso, "Hollow Fiber Membranes", in Kirk-Othmer *Encyclopedia Of Chemical Technology* (M. Grayson and D. Eckroth, eds), Wiley, New York, 1980, p.492. The hollow fiber membranes and the method of fabricating same are not the subject of this invention. However, if a fibrous electrode composed of one or more fibers (or the electrocatalyst of an electrode with one or more electrically conductive fibrous substrate) is encapsulated by the membrane, the membrane can then be used as a separator for the electrodes with exceptional properties. FIG. 2A shows the configuration of a membrane separator with a fibrous electrode inside the bore. For battery cells the separator can be applied to tightly cover the fibers with minimal or no space between the electrode fiber and the separator. In the case of other electrochemical cells, a passage in the lumen of the membrane separator is needed to allow transport of liquid or gaseous feed or product through the bore of the separator. As shown in FIG. 2B, this open passage way is introduced simply by fabricating the separator with an ID sufficiently larger than the OD of the electrode fiber or by the interstitial space between multiple fibers, as in FIG. 2C. Alternatively, a hollow fiber coated with the electrocatalyst is encapsulated by yet another membrane separator with fibrous current collectors (suppliers) on the shell side of the inner fiber. These configurations are the building block of a fiber cell.

Many different techniques can be used to form a thin layer of a membrane insulator or separator with porous, open structure around a fibrous electrode or substrate. One preferred method is to imbed the fibrous electrode inside the bore of a membrane fiber by extruding the membrane forming polymer(s) around a continuous string of a fibrous electrode. For example, as shown in FIG. 3, the membrane dope or formulation is pumped through an orifice on the extrusion mold refereed to as "spinnerette". A liquid or gas is blown through a bore-forming tube, located in the center of the extrusion orifice, as an internal coagulant or quenching media. During the spinning process, the membrane dope is extruded through the orifice opening and around the bore-former tube. The circumference of the bore-former tube forms the inside diameter of the hollow fiber. A string of fibrous electrode is pulled from an external source through the bore-former tube of the spinnerette simultaneously as the membrane material is extruded through the orifice. The membrane structure is formed around the fibrous electrode as the coated fiber is pulled through a quenching or a coagulation media such as a solvent or a gas, and the polymer is solidified. The composition of the dope formulation depends on the type of membrane that is fabricated. In general, the formulation includes a polymer that forms the backbone of the membrane, a solvent that the membrane polymer is dissolved in, a pore former compound that can be leached or extracted out of the polymer matrix. An example for fabrication of an ultrafiltration polysulfone type membrane separator is a dope composed of 10 to 30 wt %. Polysulfone, dissolved in 60 to 70% N,N-dimethylacetamide (DMAc), and 10 to 20% polyvinylpyrrolidone (PVP). In a coagulation bath of water, the water soluble solvents leach out of the membrane solution leaving a porous polysulfone membrane around the electrode. The membrane pore size, structure, and thickness formed depends on dope composition, viscosity, temperature and pumping rate, spinning temperature, composition of the internal and external coagulant, coagulation or quenching temperature, and fiber take up rate. Some membrane separators may require post treatment with plasticizing or wetting agents for retention of the membrane properties or further surface modifications. For example, the outer surface of the separator may be coated with an ion exchange resin such as Nafion or other perfluorinated ionomers or a permselective polymer. The membrane wall may have a porous isotropic or anisotropic (asymmetric) morphology, meaning a highly porous structure with foam like or channel like structure with tight surface skin. This feature is important in using the membrane as structural support for impregnating or coating with an electrocatalyst or an ion exchange polymer. In this example, the electrocatalyst can be imbedded inside the lumen of the separator as a suspended solution or slurry along with the internal coagulant. In that case a fibrous current collector will be used instead of an electrode. In the above example, the electrode fibers may also be physically threaded inside the bore of a hollow fiber membrane depending on the size or length of the fiber, using vacuum or other techniques.

Another method to form a thin layer of a porous separator material around a fibrous electrode or substrate is the conventional dip or spray coating of the fiber electrodes, using the polymer formulations that is used to fabricate the membranes followed by inserting into a quenching media similar to above extrusion process. Using this technique, a thin layer of the insulator material is coated on the fibrous electrode followed by the solidification and formation of the porous structure in the quenching media or the coagulation bath. With the coating technique, the control over the separator thickness may not be as accurate as the extrusion process. Other coating processes such as plasma, vapor deposition or polymerization may also be used with the exception that the separator material used can be transformed into a porous, permeable structure if the coating technique used does not produce an open or porous structure. A non porous insulator can be transformed into a porous, membrane like structure by other techniques such as leaching, or punching sub micron holes into the material using lasers.

The outer walls of the membrane encapsulated electrodes of the above examples are then coated or impregnated with the electrocatlyst of the second electrode or another polymer if required. The membrane encapsulated fibers can be impregnated by, for example, passing the fibers though a slurry made from the electrocatalyst followed by removing the excess coating, or thinly dip coated with a slurry that may contain a binding agent. The electrocatalyst can alternatively be extruded onto the membrane/electrode assembly using an extrusion process similar to the above example and as shown in FIG. 4. In the above cases, further treatment such as heating the fibers, may be required to dry or cure the electrocatalyst or the polymer coating on the fiber. The coated electrocatalyst may also contain an electrically conductive compound or subsequently coated or extruded again with an electrically conductive compound. FIG. 5 shows a fiber cell that contains an electrode encapsulated with a membrane separator, and electrocatalyst coated on the shell side of the separator. The electrochemical reaction and ion transport from one electrode to the other takes place on both sides of the porous wall of the membrane separator that may have a thickness of a few microns to a few millimeter. Electrically conductive current collectors (or suppliers) which are also in fibrous form can be placed alongside and parallel to the fiber cell to collect current or supply power from and to the electrocatalyst of the second electrode on the shell side of the fiber cell, if the electrocatalyst of the electrode is not electrically conductive or does not contain an electrically conductive material. FIG. 6 shows the configuration of fiber cells and the current collectors or suppliers. When the fiber cells are wound or packed in parallel, each current collector (supplier) comes in contact with the outside walls of the other fiber cells in its surrounding.

If the electrocatalyst of the second electrode is not coated onto the outside wall of the membrane separator, it can be impregnated, coated or extruded on a fibrous current collector forming a second electrode. Similar to the configuration shown in FIG. 6, the second electrode will lie in contact or parallel to the membrane and the first electrode assembly. In these configuration the first and the second electrode could be either negative or positive electrodes.

For electrochemical cells other than batteries a cell structure may involve coating the electrocatalyst on a hollow fiber membrane, encapsulating the coated fiber along with one or more of current collector (supplier) fibers with another membrane separator, coating the outer surface of the separator with the second electrocatalyst as shown in FIG. 7, and encapsulating again with another layer of the porous membrane material as a protective coating with one or more current collector (supplier) fibers. With this cell configuration, the feed or reactants to the electrode are introduced inside the bore and to on the shell side of the cell. The multiple encapsulation structure described above are done using an extrusion process similar to the process shown in FIG. 3.

An advantage of the cells of the present invention is that a small amount of the electrocatalyst can be impregnated, coated or extruded on a fibrous substrate to form an electrode. This may be done, for example by plasma deposition of one or few atomic layer of the electrocatalyst on the fibrous electrode, resulting in lower material weight and cost.

The choice of the material of construction for the membrane may depend on the type and application of the battery, fuel or electrochemical reaction cell. Polymeric material such as polypropylene, polysulfone, polyethylene, regenerated cellulose acetate, and any other polymers currently used in fabricating hollow fiber membranes including glass and ceramics can be used to fabricate the separator. For example, for high temperature fuel cells a glass or ceramic membrane separator material may be required. It is important to choose a material that is compatible with the electrolyte used, i.e., the electrolyte, the reactants, products, and intermediates would not deteriorate the separator. Membranes separators of various pore sizes can be used as the separator material. In general, the smaller the pore size the higher the capillary effect for liquid electrolyte retention.

The fiber cells of the present invention can be packaged into containers of various sizes in parallel or series in order to make batteries, fuel cells or other electrochemical cells.

To use the fiber cells of this invention for various electrochemical processes other than batteries, the fiber cells are densely packed in a housing such that the bore side of the fibers which contain an electrode is isolated from the shell side of the cells which contain the other electrode, a modular unit such as shell and tube heat exchangers units.

As an example, fiber electrodes encapsulated with the membrane separator and fibers of a second electrode are densely bundled around a perforated tube shown in FIG. 8A. This tube, as will be shown in the final assembly, serves as the feed tube to the shell side of the fibers. The fiber bundle is epoxy potted at both ends, with the fibrous substrates extending through the potted area, in order to isolate the bore and shell side of the fibers. For ceramic fibers or high temperature applications, ceramic potting material may be used. The potted ends are then machined to the desired size to form a tube sheet. The ends of the electrodes (the substrate fiber) inside the bore of the fiber cells and the second electrodes from the shell side are connected to a common connector in order to form a single anode or cathode. Alternatively, an electrically conductive strap wrapped around the bundle can form as anode or cathode if the fiber cells have sufficient electrical conductivity. The fiber bundle with "O" ring seals is inserted in a housing with feed inlet and outlet for the shell side and the bore side. A cross sectional view of potted fiber cells and side view of the fiber bundle in the housing are shown in FIGS. 8B and 9 respectively. Alternatively, the bundle can be permanently potted in the housing similar to FIG. 9 without the requirement of machining or "O" ring seals. In an electrochemical process, reactants or feed, in liquid or gaseous form are contacted with the electrodes, by passing the material through the bore or the shell side of the fiber cells. The fiber bundle housing can be a polymeric or metallic material depending on the temperature and pressure requirement of the process. The housing design for utilization of the fiber cells is not the subject of this invention. Similar housing designs have been extensively cover ed in literature for fabrication of hollow fiber membrane separation units.

EXAMPLES

The following example demonstrates the application of a high surface area electrode for fabrication of an energy storage device or an electrochemical cell.

Example 1 - High Surface Area Electrode

A tow of 20 fibrous electrodes (anode) with an OD of 500 micrometer was encapsulated with a polysulfone ultrafiltration type microporous membrane separator with a thickness of about 100 micrometer. The outside diameter of the encapsulated bundle is about 3 millimeter. Another tow of 20 electrodes was encapsulated with the same membrane as cathode.

The two electrodes are used to fabricate an energy storage device such as a battery, or an electrochemical cell.

The following example demonstrate the extremely high electrode surface area that can be packed into a given volume using the fiber cell geometry of this invention for fabricating batteries.

Example 2 - Battery Cell

Figure 1A:
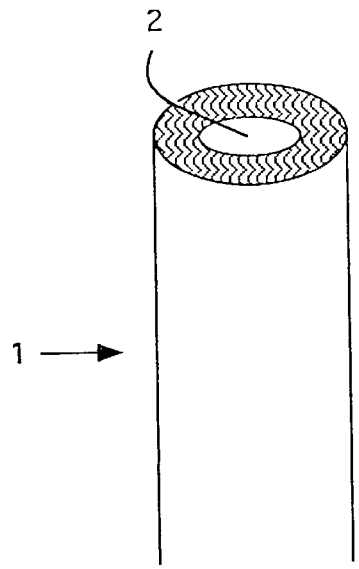
FIGS. 1A and 1B depict cross sectional view of a hollow fiber membrane 1, the bore of the separator 2, and the porous wall of the membrane 3.
Figure 1B:
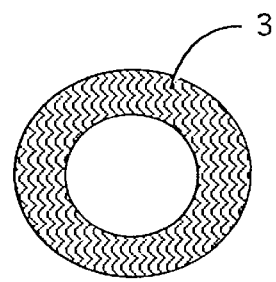
Figure 2A:
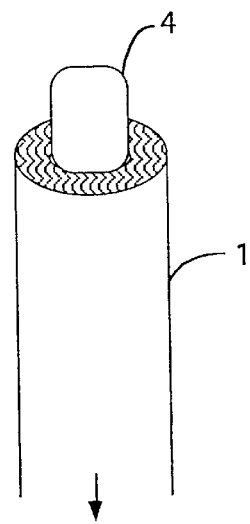
FIG. 2A shows the hollow fiber membrane 1 as separator for fibrous electrode 4.
Figure 2B:
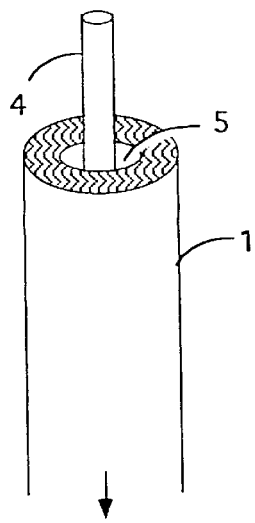
FIG. 2B shows OD of the electrode 4 selected smaller than separator ID to allow passage 5 for liquid or gas feed or product.
Figure 2C:
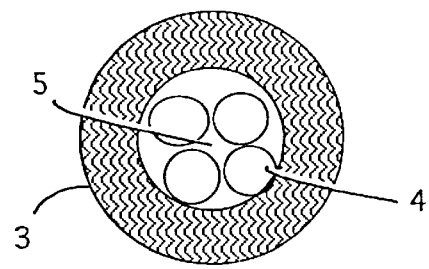
FIG. 2C shows a tow of electrodes 4 creating passage 5.
Figure 3:
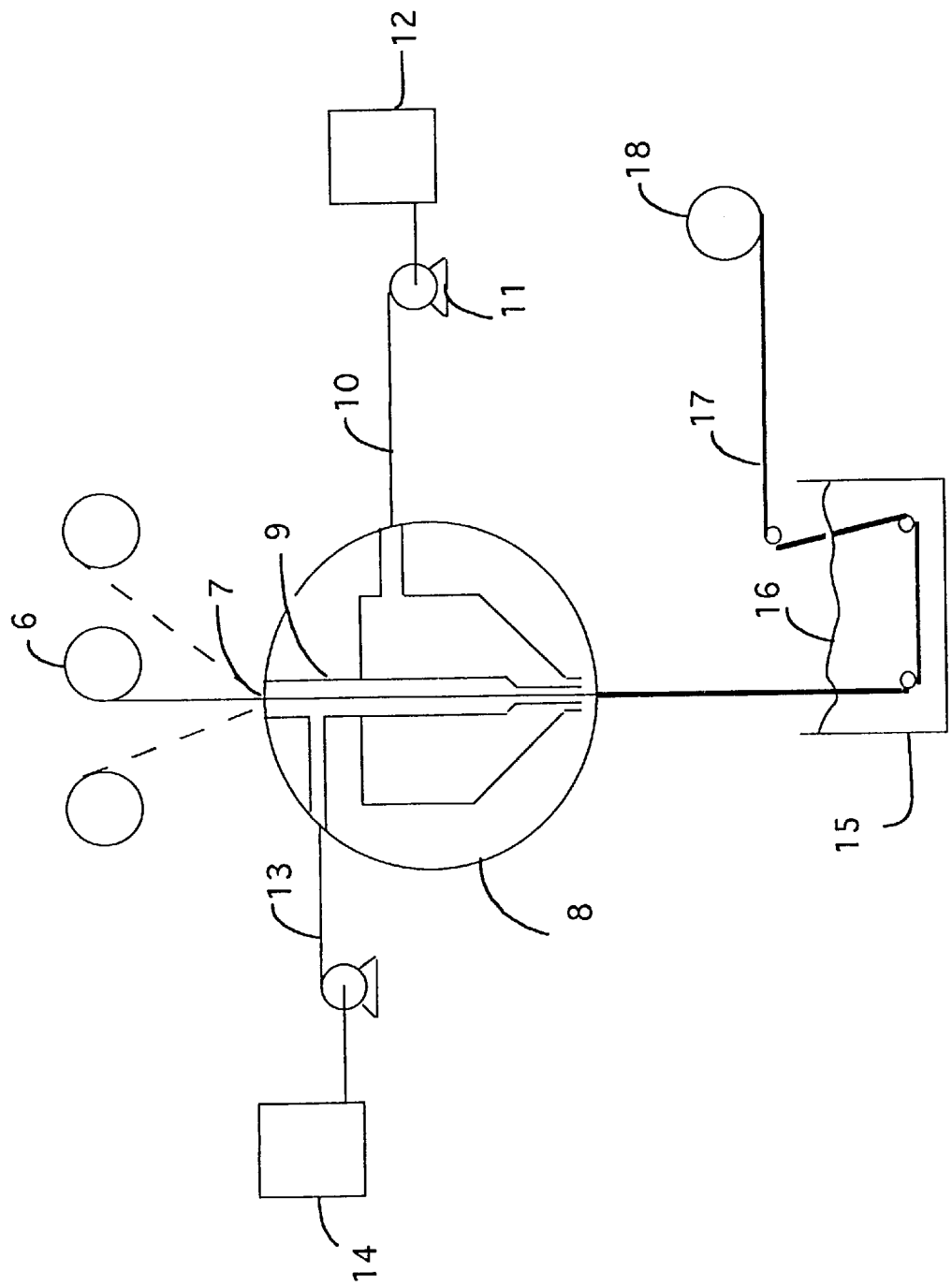
FIG. 3 illustrates the process for forming a layer of membrane separator around a fibrous electrode. A string or a tow of electrode fibers 7 from electrode spool(s) 6 are passed through the bore former tube 9 of an extrusion mold (spinnerette) 8. A stream of a membrane formulation 10 is pumped from tank 12 using pump 11 to the spinnerette and through the orifice and around the bore former tube with electrodes(s) running though it. Gaseous, or liquid internal coagulants (with suspended slurry of electrocatalyst) 13 is pumped from tank 14 through the bore former tube 9. The extruded fibers enter a coagulation or quenching bath 15, where the bore former is extracted by the gaseous or liquid media 16. The membrane covered electrode 17 is taken up by winder 18.
Figure 4:
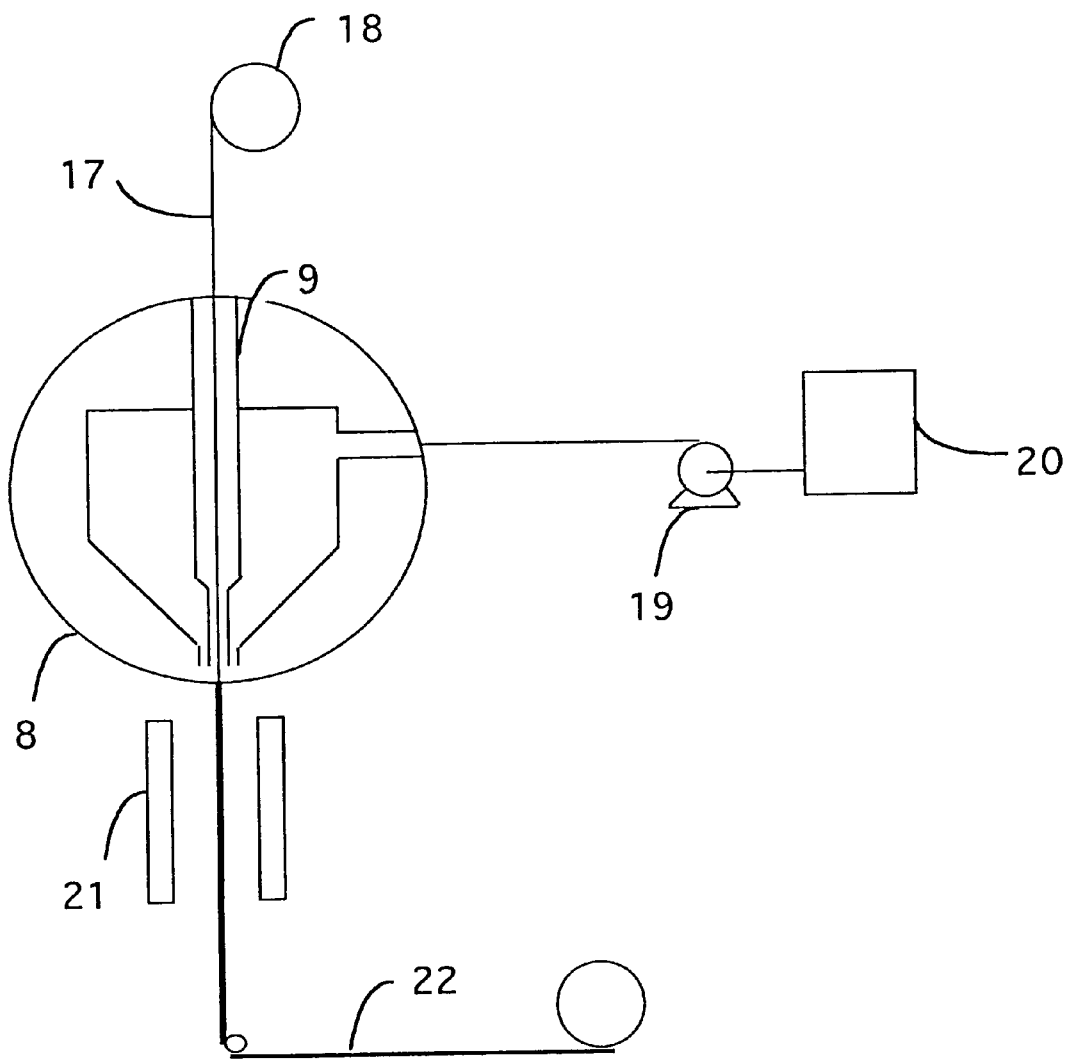
FIG. 4 depicts the process flow diagram for extruding electrocatalyst paste (or a polymer) on the membrane/electrode assembly 17. The fiber 17 is passed through the bore former tube 9 of the spinnerette 8. Electrocatalyst paste (or coating polymer) is pumped from tank 20 using pump 19 around fiber 17. The coated fiber cell 22 is cured and dried with heat panels 21.
Figure 5:
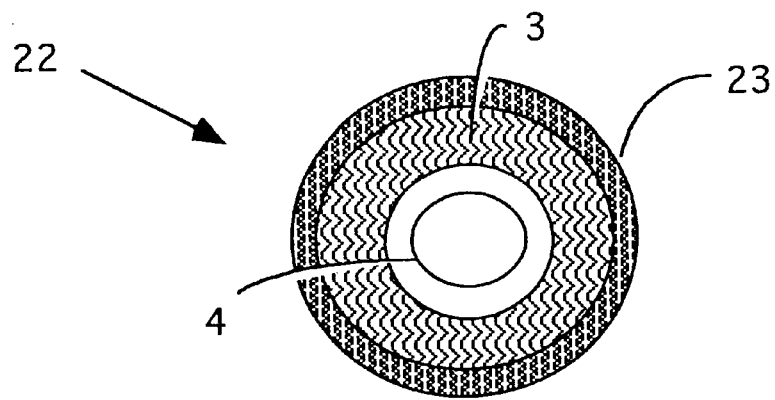
FIG. 5 illustrates the cross sectional view of fiber cell 22. Electrode 4 is surrounded by membrane 3. Electrocatalyst 23 is impregnated, coated or extruded onto the membrane wall.
Figure 6:
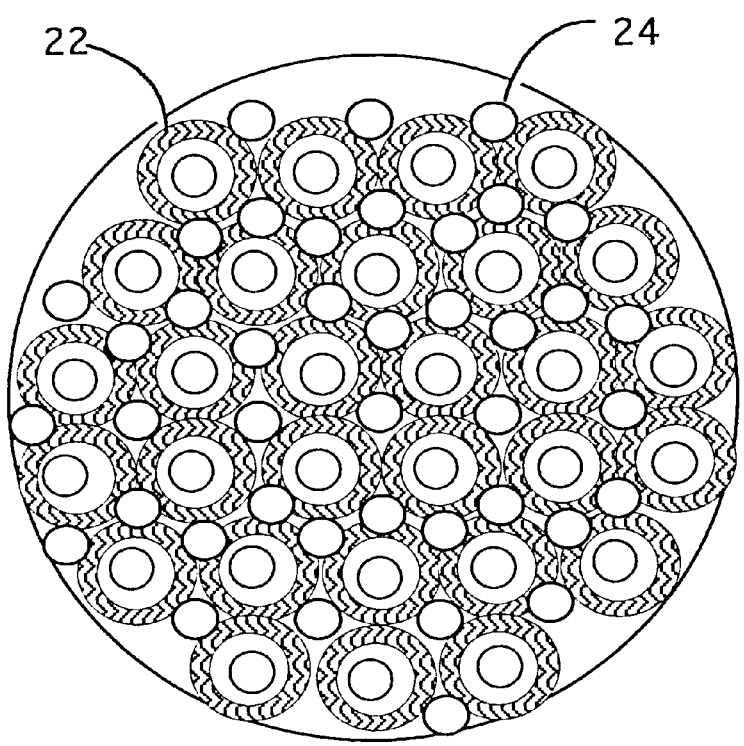
FIG. 6 depicts cross sectional view of fiber cells 22 packed with current collectors (suppliers) 24.
Figure 7:
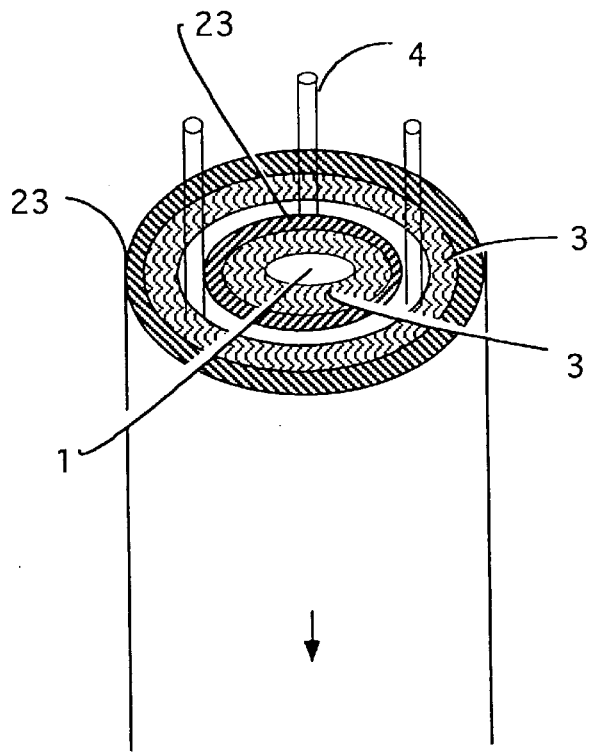
FIG. 7 shows alternative cell design for liquid or gaseous passage. An inner hollow fiber membrane 1 is covered with electrocatalyst material 23. Electrodes 4 or current collector (supplier) 24 are placed in intimate contact with the shell side of inner membrane. A layer of membrane separator 3 is extruded onto the inner hollow fiber and electrode(s). A layer of eletrocatalyst 23 is extruded on the wall of the outer membrane.
Figure 8A:
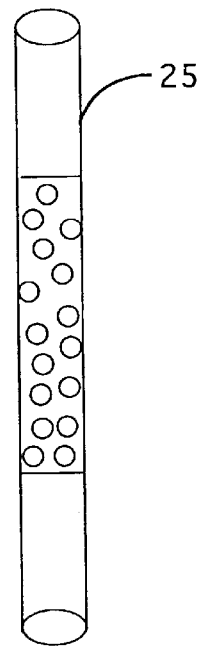
FIG. 8A shows mandrel tube 25 with a perforated mid section.
Figure 8B:
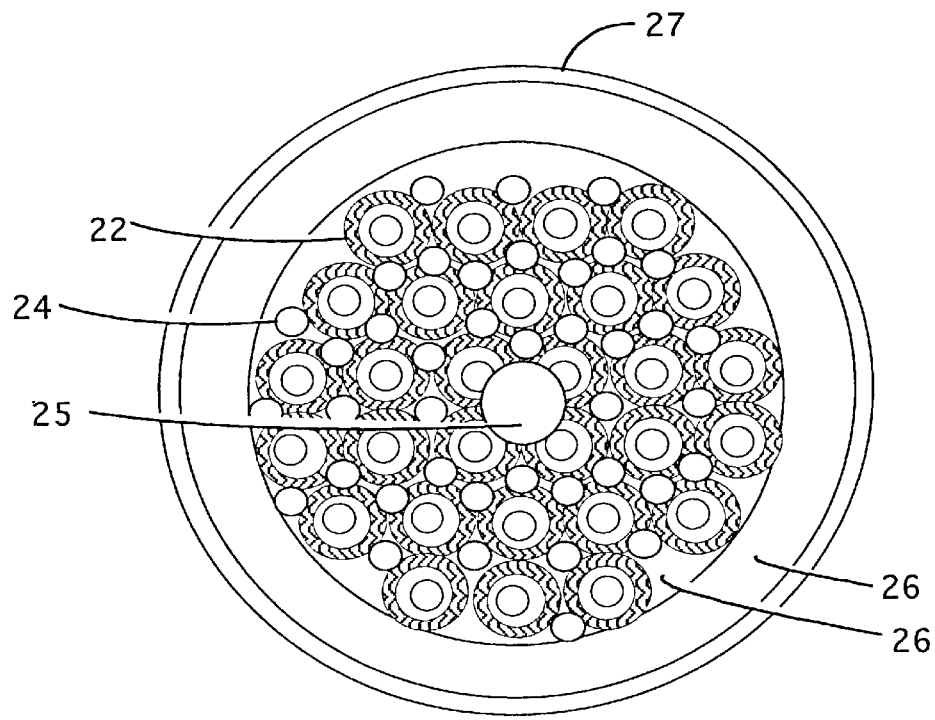
FIG. 8B shows the cross sectional view of potted end of a tubesheet containing mandrel 25, fiber cells 22, and current collectors (supplier) 24, potting matrix 26, and optional "O" ring 27.
Figure 10:
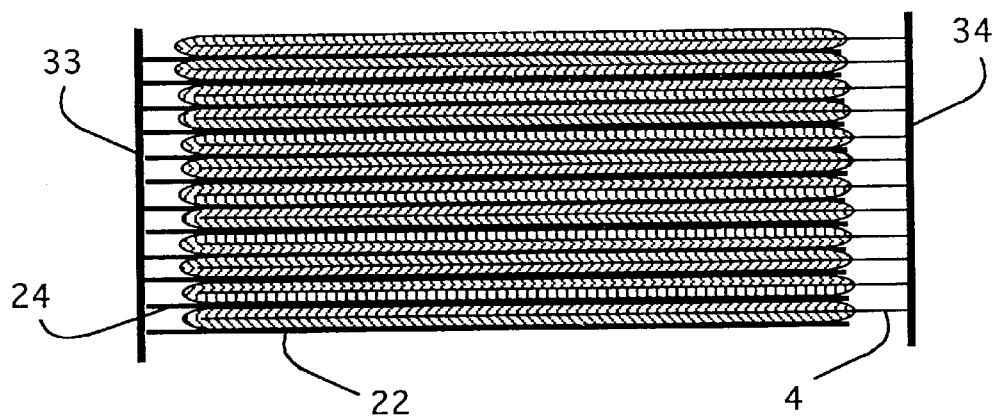
FIG. 10 shows the side view of a battery cell. Fiber cells 22 are packed in parallel. Electrodes 4 and current collectors 24 are connected to plates 33 and 34 to form positive or negative terminals.

The following calculation shows the electrode surface area that can be packed into a battery container 1 cm in diameter, and 5 cm long using fiber cells of this invention with an outside diameter of 500 micrometer placed in parallel as shown in FIG. 10. The diameter of the second electrode or the current collector of the second electrode is chosen such that it falls inside the interstitial space created by four or less fiber cells as shown in FIG. 6.

Cross sectional area of the battery M=×(1)2/4=0.7853 cm2.

Cross sectional area of one fiber cell M=×(0.05)2/4= 0.00196 cm2.

Minimum or effective surface area of the battery cross section utilized by the fibers=78% of the total surface area=0.78×0.7853=0.6123 cm2.

Number of fibers that can be packed in the effective cross sectional area of the battery=0.6123/0.00196=312.

The outside or shell surface area of a fiber cell 5 cm long =×0.05×5=0.7853 cm2.

Theoretical surface area of the 312 fiber cells packed in the battery=312×0.7853=245 cm2.

Assuming a minimum of 75% packing efficiency;

The practical surface area of the cells packed in the battery=0.75×245=183.75 cm2.

Surface area to volume ratio: 30 cm2/cm3.

Example 3 - Battery cell

First, the positive electrode of a lead-acid battery was made by passing a lead coated metal fiber with an OD of about 200 micrometer through a solution of sulfuric acid. The wetted fiber was then coated with a thin layer of lead, and lead oxide powder by passing it through the powder tray. The fiber was then passed over an open flame to further oxidize the lead and fuse the powder to the fiber. The electrode was then encased by an ultrafiltration type membrane of about 800 micrometer OD. A six inch section of the assembly of the electrode and the membrane separator was then immersed in the sulfuric acid solution for a few minutes to saturate the fiber pores with the electrolyte. The electrode/separator assembly was then coated with the lead powders by a sweeping action on the powder tray. The excess powder was wiped off from the membrane surface leaving only a small amount of the material impregnated inside the surface pores. The OD of the fiber did not change after impregnation.

A second metal fiber, with similar dimensions was dipped into sulfuric acid and placed in parallel alongside and in contact with the cell assembly, as current collector (negative electrode), by covering the two fibers with a plastic tube of about 2 millimeter ID. Using a voltmeter, a maximum voltage of 0.90 V, and current of 0.45 A was measured.

Example 4 - Fuel Cell

Figure 9:
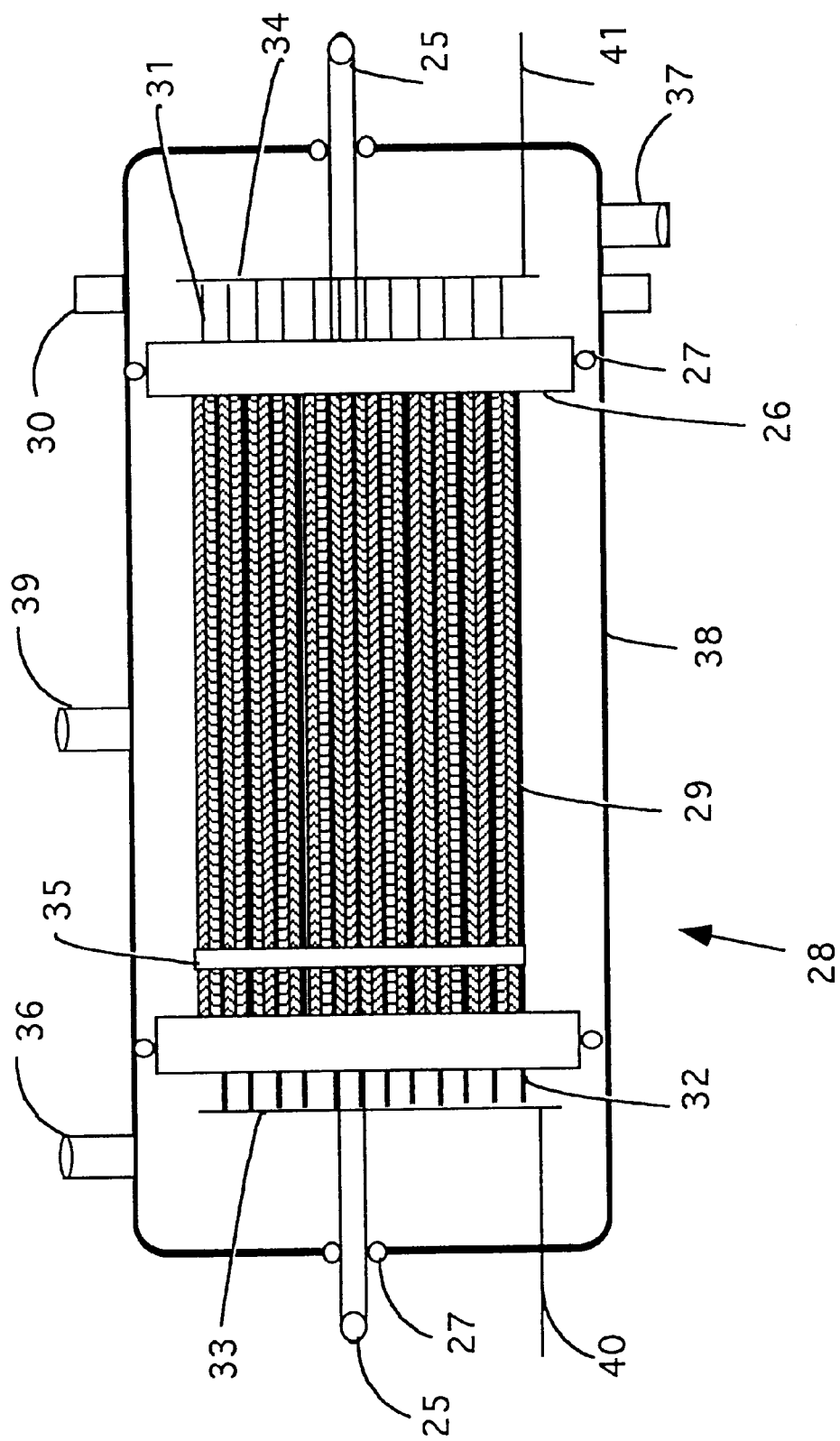
FIG. 9 illustrates side view of an electrochemical cell module 28. Fiber bundle 29 is placed inside casing 38 with mandrel 25 extending through the casing. The tubesheet 26 is sealed to the casing by "O" rings 27. The positive or negative electrodes 31, and 32 are connected to plates 33 and 34 to form the positive and negative terminals. Casing 38 can optionally have a flanged cap 30 at one end to allow insertion of the fiber bundle 29 inside the casing. Casing 38 has inlet and outlet 36 and 37 to the lumen side of the cells and inlet and outlet 25, and 39 to the shell side of the cells. Plates 33 and 34 are electrically connected to an outside source as cathode or anode 40, and 41. Alternatively, an electrically conductive strip 35 can be wrapped around the bundle to form a positive or negative terminal if the shell side of cells have sufficient electrical conductivity.
Figure 11:
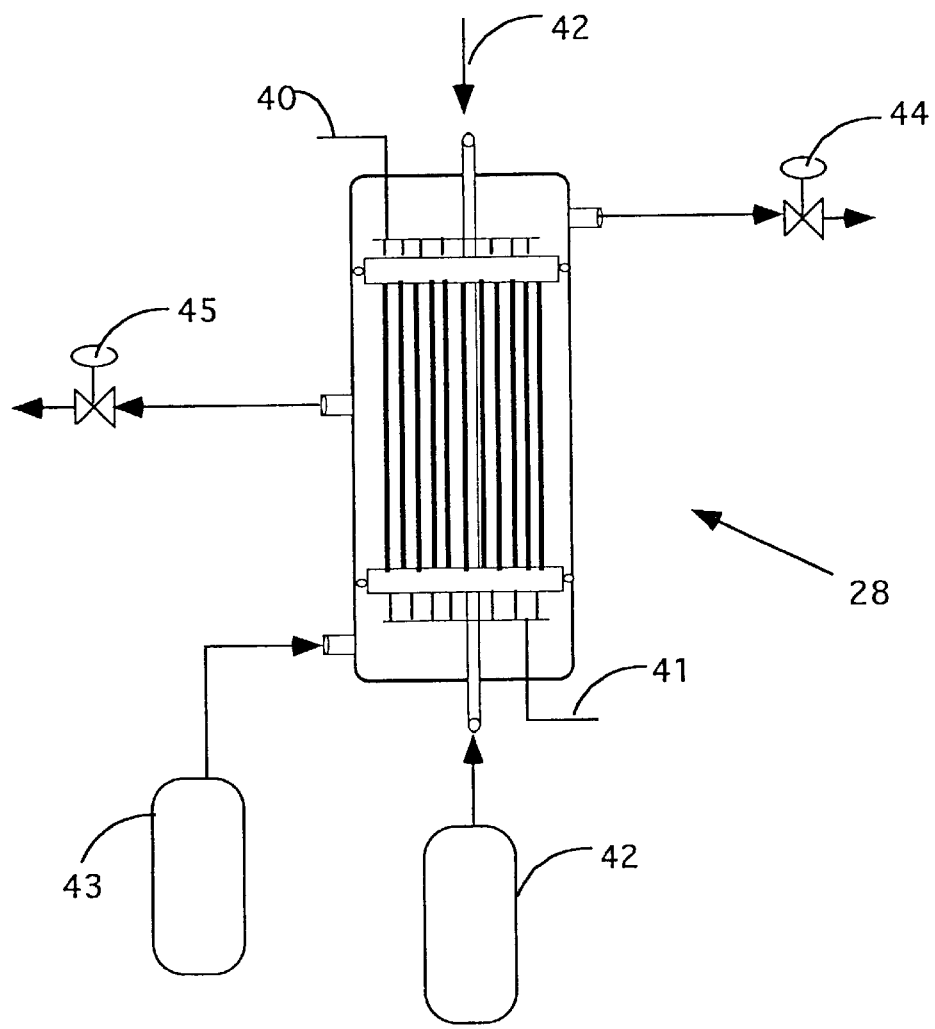
FIG. 11 shows an electrochemical cell module 28 as a fuel cell. Oxygen 42, and hydrogen 43 are introduced to the bore side and the shell side of the fiber cells. Back pressure regulators 44 and 45 control the transmembrane pressure.

Platinum coated metal fibers of approximately 200 micron OD, are encapsulated by an ultrafiltration type membrane separator of about 500 micron ID. The fibers are then cut to 30 inches long. Cathode Electrodes of the same size are bundled alternatively with the membrane covered electrodes. The bundle, containing approximately 83 square feet surface area, is epoxy potted at the ends and placed in the housing similar to FIG. 9. The housing is cylindrical with an ID of about 5 inches and is 3 feet long. The effective length of the fiber cells after potting is 2 feet. Water is pumped through the bore and shell side of the fibers and immobilized as electrolyte in the porous wall of the membrane separator. Excess water is drained out of the fiber cell module. The module is then connected to hydrogen and oxygen gas tanks as shown in FIG. 11. The pressure on either side of the fiber cell is controlled and balanced by pressure regulators if required. The cell module exhibits the following features:

Surface area to volume ratio of about: 244 ft2/ft3

Module is run at a transmembrane pressure with water remaining immobilized in the membrane pores due to the capillary effect.

Water can be circulated through the membrane under high pressure to prevent drying on anode side.

Module can be operated under high gas pressures.

Example 5 - Chlorine production

Figure 12:
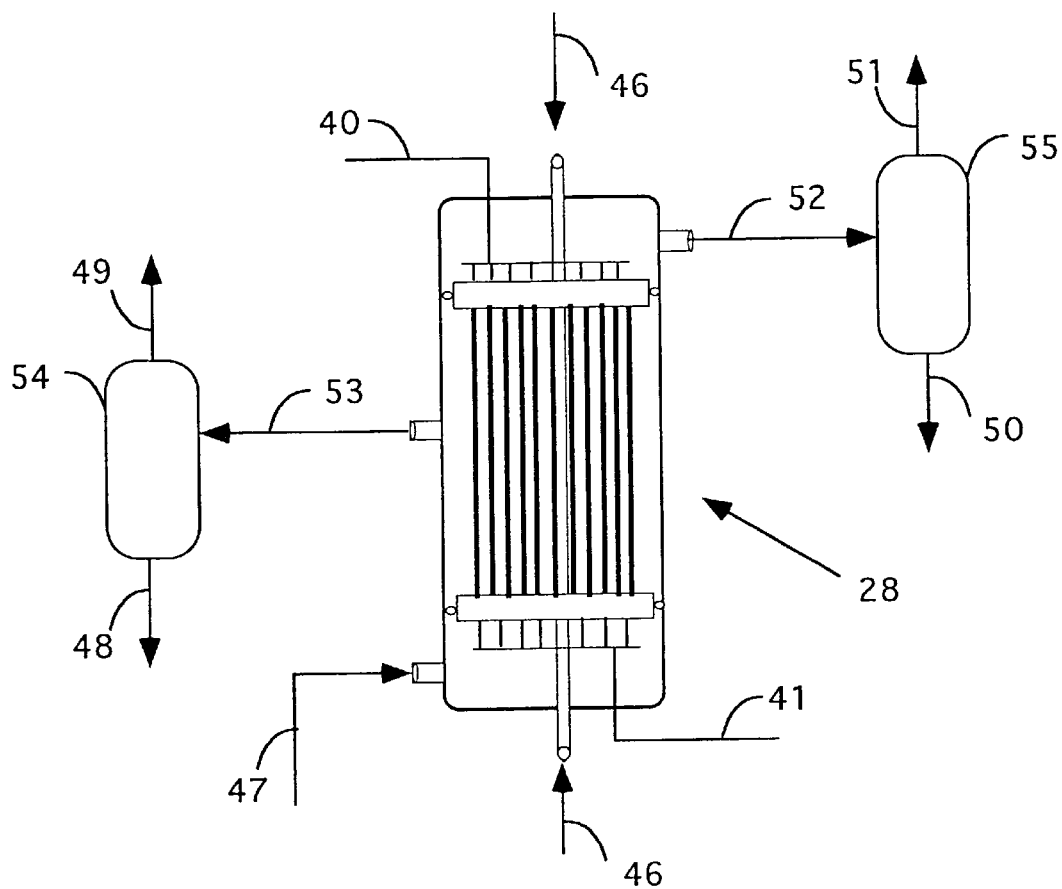
FIG. 12 illustrates an electrochemical cell module as a chloro-alkali cell. Concentrated NaCl solution 47 and water 46 are introduced to the bore and shell side of the module 28. Electric current is applied through terminals 40 and 41. The stream of Chlorine gas and diluted NaCl, 53, is sent to gas/liquid separator 54 where $Cl_2$ gas 49 and sodium chloride solution 48 are separated. The stream from bore side, 52, is also sent to gas liquid separator 55 where $H_2$ gas 51 and concentrated NaOH solution 50 is recovered.

A fiber cell module similar to Example 2 is used as a chloro-alkali cell with the exception that the membrane separator is coated with Nafion solution and electrodes contain Ruthenium and Iridium electrocatalyst. A concentrated NaCl solution is pumped through the bore of the fibers while pure water is pumped to the shell side. A voltage is maintained between the anode and the cathode. Chlorine gas and diluted NaCl from the cathode are sent to a gas/liquid separation drum in which the product gas is recovered. Similarly, the hydrogen and concentrated NaOH are recovered from the anode. The process flow diagram is shown in FIG. 12. The cell Module exhibits the following features:

High surface area

Low operating voltage due to virtually no spacing between the membrane and the electrodes.

Low electrocatalyst cost due to high surface area utilization.

What is claimed is:

1. An electrochemical process for generating electrical energy or chemical products comprising the passing of a gaseous or liquid feed through fibrous electrochemical cells of an electrochemical module, said cells comprising, at least one hollow, fibrous, porous, membrane separator having a bore side, shell side and lumen, an electrolyte disposed in the pores of the separator, at least one inner electrode located within said lumen of said bore side and at least one outer electrode located adjacent to the shell side of said separator, said electrodes formed from electrically conductive fibers in contact or covered with an electrocatalyst, forming positive and negative electrodes, and at least one feed inlet and outlet from said electrodes, where said feed is passed from the shell side or through the lumen of the bore side of said membrane separator, said feed contacting the positive and negative electrodes of a fibrous electrochemical cell;

placing said electrochemical cells in a casing, sealing and isolating said shell or bore side of said electrochemical fibers, connecting said electrodes to plates forming positive and negative terminals, and reacting said feed components on said electrodes generating electrical energy or applying a voltage to said terminals generating chemical products.

2. The process of claim 1 wherein said inner electrode is formed from an electrically conductive fiber coated with an electrocatalyst.

3. The process of claim 1 wherein said inner electrode is formed by coating or impregnating an electrocatalyst material on the shell side of a second, inner, porous, hollow fiber which has at least one fibrous current collector in contact with the shell side of said second, inner porous, hollow fiber forming an inner electrode; said inner electrode housed within the bore of the first hollow, fibrous, porous membrane separator, wherein the lumen of said second, inner, porous, hollow fiber allows for free passage of feed components to said inner electrode.

4. The process of claim 1 wherein said inner electrode is formed from an electrically conductive fiber coated with an electrocatalyst, said coated fiber in contact with the shell side of a second, inner, porous, hollow fiber forming an inner electrode; said inner electrode housed within the bore of said first hollow, fibrous, porous membrane separator, wherein the lumen of said second, inner, porous, hollow fiber allows for free passage of feed components to said inner electrode.

5. The process of claim 1 where said outer electrode is formed from coating or impregnating an electrocatalyst material on the shell side of said hollow, fibrous, porous membrane separator, or by placing an electrically conductive fiber coated with an electrocatalyst in contact with the shell side of said hollow, fibrous, porous membrane separator.

6. The process of claim 1 where said electrochemical cells have an outer diameter from about 100 micrometers to about 10 millimeters.

7. The process of claim 1 where at least one electrode is composed of one or more fibers having an outer diameter from about 10 micrometers to about 10 millimeters.

8. The process of claim 1 where said feed components to said electrodes comprise hydrogen and oxygen.

9. The process of claim 1 where at least one feed component is a sodium chloride solution.

10. The process of claim 1 where at least one feed component is circulated through the shell or pore side of the electrochemical cell.

11. The process of claim 1 wherein the porous, membrane separator is selected from microfiltration, ultrafiltration, reverse osmosis, semi-permeable, or ion-exchange membranes.

12. The process of claim 1 wherein the porous, membrane separator is fabricated from a material selected from the group consisting of ceramic, glass and polymeric membranes.

13. The process of claim 1 wherein the porous, membrane separator further comprises a perm-selective or ion exchange polymer coated onto the shell or bore side of said separator.

14. The process of claim 1 comprising applying a transmembrane pressure across the shell or bore side of said membrane separator.

15. The process of claim 8 comprising circulating water vapor or water liquid through said shell or bore side of said electrochemical cell.

* * * * *